US010069563B2

(12) United States Patent
Yamaguchi

(10) Patent No.: US 10,069,563 B2
(45) Date of Patent: Sep. 4, 2018

(54) OPTICAL MODULE AND OPTICAL TRANSMISSION SYSTEM

(71) Applicant: NEC Corporation, Tokyo (JP)

(72) Inventor: Hiroshi Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/461,879

(22) Filed: Mar. 17, 2017

(65) Prior Publication Data
US 2017/0272154 A1 Sep. 21, 2017

(30) Foreign Application Priority Data
Mar. 18, 2016 (JP) .................................. 2016-055017

(51) Int. Cl.
H04B 10/00 (2013.01)
H04B 10/11 (2013.01)
G02B 26/08 (2006.01)
G02B 27/30 (2006.01)
H04B 10/54 (2013.01)
H04J 14/00 (2006.01)

(52) U.S. Cl.
CPC ......... *H04B 10/11* (2013.01); *G02B 26/0833* (2013.01); *G02B 27/30* (2013.01); *H04B 10/54* (2013.01)

(58) Field of Classification Search
CPC ... H04B 10/11; H04B 10/114; H04B 10/1141; H04B 10/1143; H04B 10/116
See application file for complete search history.

(56) References Cited

U.S. PATENT DOCUMENTS

2004/0197098 A1* 10/2004 Iwamoto ............ H04B 10/1143
398/32
2004/0264972 A1* 12/2004 Killinger ................ H04B 10/11
398/130
2014/0328597 A1* 11/2014 Bhide ................ H04B 10/1121
398/118
2017/0288784 A1* 10/2017 Li ........................ H04B 10/691

FOREIGN PATENT DOCUMENTS

| JP | H09-96767 A | 4/1997 |
| JP | 2004-080253 A | 3/2004 |
| JP | 2006-094135 A | 4/2006 |
| JP | 2007-184706 A | 7/2007 |
| JP | 2008-028756 A | 2/2008 |

OTHER PUBLICATIONS

Office Action corresponding to JP 2016-055017 issued by the Japanese Patent Office dated Dec. 20, 2016 (6 total pages).

* cited by examiner

Primary Examiner — Daniel Dobson
(74) Attorney, Agent, or Firm — Wilmer Cutler Pickering Hale and Dorr LLP

(57) ABSTRACT

In order to change opposed communication destinations in a simple structure, an optical module includes an optical collimator to take in and output collimated light and a mirror capable of taking a tilt angle to make the collimated light and the optical collimator be coupled.

13 Claims, 12 Drawing Sheets

FIG. 7

|   | A-C | A-D | B-C | B-D |
|---|-----|-----|-----|-----|
| A | X2  | X1  | -   | -   |
| B | -   | -   | X3  | X2  |
| C | X2  | -   | X1  | -   |
| D | -   | X3  | -   | X2  |

FIG. 12

|   | A-B | A-C | A-D | B-C | B-D | C-D |
|---|-----|-----|-----|-----|-----|-----|
| A | X3  | X2  | X1  | -   | -   | -   |
| B | X1  | -   | -   | X3  | X2  | -   |
| C | -   | X2  | -   | X1  | -   | X3  |
| D | -   | -   | X3  | -   | X2  | X1  |

United States Patent — US 10,069,563 B2

OPTICAL MODULE AND OPTICAL TRANSMISSION SYSTEM

This application is based upon and claims the benefit of priority from Japanese Patent Application No. 2016-055017, filed on Mar. 18, 2016, the disclosure of which is incorporated herein in its entirety by reference.

TECHNICAL FIELD

The present invention relates to an optical module and optical transmission system, and, more particularly, to an optical transmission system to which the optical space transmission technology is applied and an optical module used in it.

BACKGROUND ART

Fiber optics transmission has a characteristic that high speed transmission is available without being affected by signals of other lines. Therefore, the fiber optics transmission is also used for not only a communication network provided by a common carrier but also for connection between modules of a super computer that needs high-speed parallel transmission of data.

In the fiber optics transmission, as for the connection between optical transmission and optical reception devices, one-to-one connection by optical fibers is a basic configuration. Therefore, in the case where a plurality of nodes of computers are connected by parallel transmission using optical fibers, for example, when the number of optical interfaces of the computers increase, the number of optical fibers also increases in proportion to it. Also, it was necessary for optical fibers to be connected to optical switches in order to connect among a large number of optical interfaces, and thus there have been cases where a structure of optical transmission lines are complicated.

On the other hand, an optical space transmission system is known as a communication configuration capable of high speed transmission without laying optical fibers (refer to e.g., patent literature 1: JP 2004-080253).

SUMMARY

An example object of the invention is to provide an optical module and an optical transmission system which can change opposed communication destinations by a simple structure.

An example object of the invention is to provide an optical module including an optical collimator to take in and output collimated light and a mirror capable of taking a tilt angle to make the collimated light and the optical collimator be coupled.

An example object of the invention is to provide a control method of an optical module including an optical collimator to take in and output collimated light and a mirror, the method including setting a tilt angle of the mirror so as to make the collimated light and the optical collimator be coupled.

An example object of the invention is to provide a control method of an optical transmission system including a first optical module and a second optical module each including an optical collimator to take in and output collimated light and a mirror, the method including: receiving from a first optical module a request for connection with a second optical module; reading a tilt angle of a mirror of the first optical module and a tilt angle of a mirror of the second optical module for connecting the first optical module and the second optical module; and instructing the first optical module and the second optical module to perform setting of the respective tilt angles read from the table.

The present invention provides an optical module and an optical transmission system which can change opposed communication destinations in a simple structure.

BRIEF DESCRIPTION OF THE DRAWINGS

Exemplary features and advantages of the present invention will become apparent from the following detailed description when taken with the accompanying drawings in which:

FIG. 7 is an example of a table indicating combinations of optical modules 201-204 opposed to each other and a setting example of a tilt angle of the mirror 13 on that occasion;

FIG. 12 is an example of a table indicating opposed combinations of optical modules 601-604 and setting of a tilt angle of the mirror 13 on that occasion.

EXAMPLE EMBODIMENT

The embodiments of the present invention will be described below. Note that, an arrow for indicating a direction of a signal given in drawings shows an example in each embodiment, and it does not limit a direction and a kind of the signal.

First Embodiment

Figure 1:
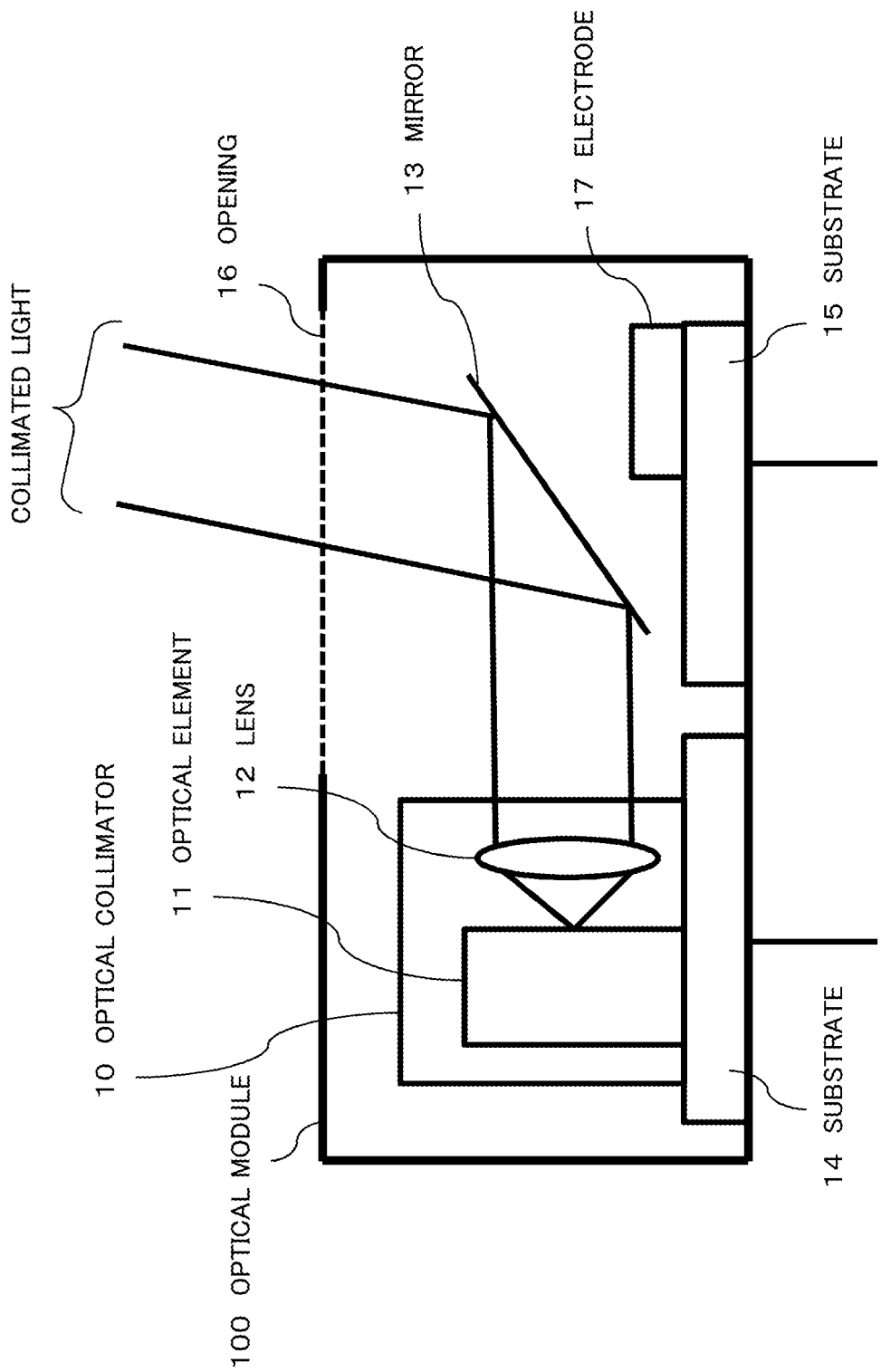
FIG. 1 is a diagram indicating an internal configuration example of an optical module 100 of a first embodiment.

FIG. 1 is a diagram which shows an internal configuration example of optical module 100 of the first embodiment of the present invention. Referring now to FIG. 1, the optical module 100 includes an optical collimator 10, a mirror 13, substrates 14 and 15, and an electrode 17. The optical collimator 10 is an optical component configured to be coupled with collimated light (parallel beam), and includes an optical element 11 and a lens 12. For example, the optical element 11 is an optical emitting component such as semiconductor lasers or an optical receiving component such as a photodiode. The optical element 11 is formed on the substrate 14 and is connected to the outside of the optical module 100 through the substrate 14 electrically. When the optical element 11 is an optical emitting component, the optical collimator 10 outputs modulated collimated light based on an electrical signal applied from the outside. When the optical element 11 is an optical receiving component, the optical collimator 10 outputs an electrical signal corresponding to the intensity of received collimated light to the outside. That is, the optical collimator receives or outputs collimated light.

The lens 12 makes the optical element 11 be coupled with collimated light optically. The optical module includes an opening 16 through which collimated light to be coupled with the optical collimator 10 is input and output. The opening 16 is an optically transparent part made of glass and the like. Note that, if communication with an opposed optical module is possible, light that the optical collimator 10 transmits does not need to be collimated light. Also, if communication with an opposed optical module is possible, light received by the optical collimator 10 also does not need to be collimated light.

The mirror 13 is an optical element to reflect light and formed above the substrate 15. In FIG. 1, description of a support structure of the mirror 13 is omitted for simplification. In the optical module 100, the mirror 13 changes its angle (tilt angle) so that the optical collimator 10 may be coupled with a collimated light inputs or outputs through the opening 16. As the mirror 13, a micro mirror using the micro electro mechanical system (MEMS) technique can be used. The electrode 17 is provided in the vicinity of the mirror 13, and is connected to the outside of the optical module 100 through the substrate 15 electrically. A tilt angle of the mirror 13 can be controlled by applying voltage to the electrode 17. The definition of the tilt angle is arbitrary, and, for example, it may be such that the tilt angle when the mirror 13 is parallel with the substrate 15 is made to be zero degree.

Figure 2:
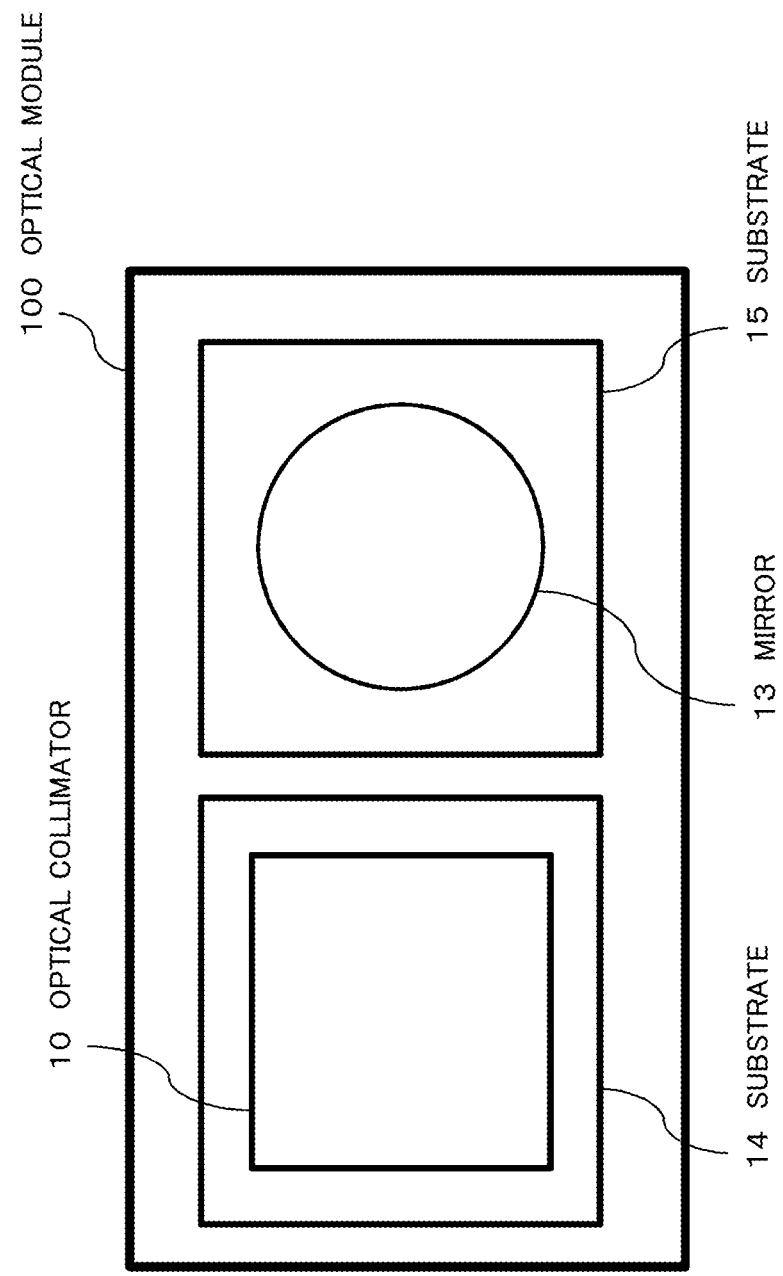
FIG. 2 is an example of a top view of an internal configuration of the optical module 100.

FIG. 2 is a top view of internal configuration of the optical module 100. In FIG. 2, only the optical collimator 10, the mirror 13, the substrates 14 and 15 are described among the components of the optical module 100. In FIG. 2, in the case where the optical collimator 10 transmits an optical signal, for example, collimated light to be transmitted is reflected by the mirror 13 and is output to the front face side of the paper face in a manner intersecting with the paper face.

Figure 3:
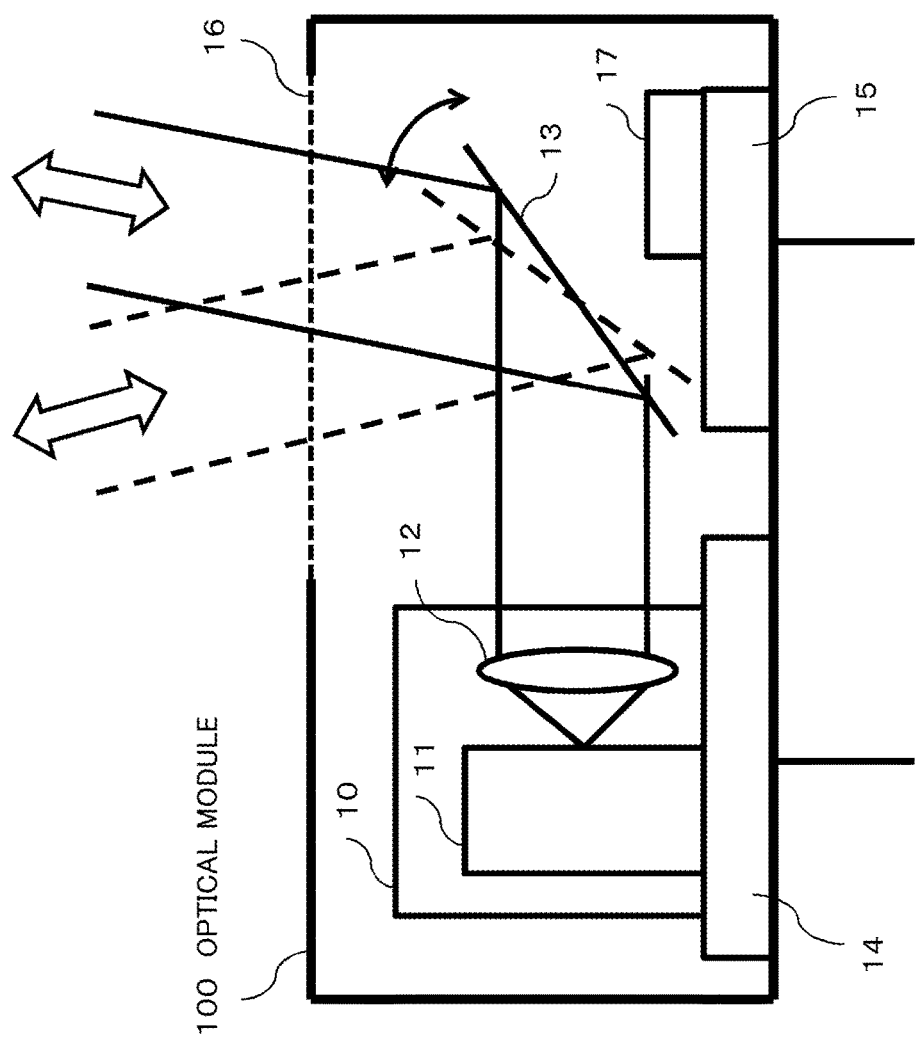
FIG. 3 is a diagram describing an example of control of a tilt angle of a mirror 13.

FIG. 3 is a diagram describing an example of control of a tilt angle of the mirror 13. A tilt angle of mirror 13 can be adjusted by changing voltage to be applied to the electrode 17. In FIG. 3, the mirror 13 is adjusted to either the tilt angle of the continuous line or of the dashed line by application of voltage to the electrode 17. As a result, corresponding to a tilt angle of the mirror 13, the direction of collimated light to be coupled with the optical collimator 10 also changes to either the direction of continuous line or of the dashed line. Thus, when the optical module 100 transmits light, the optical module 100 can control the direction of collimated light to be sent by adjusting the tilt angle of the mirror 13 by voltage applied to the electrode 17. Also, in the case where the optical module 100 receives light, it can selectively receive a collimated light from collimated lights of different arrival directions.

Figure 4:
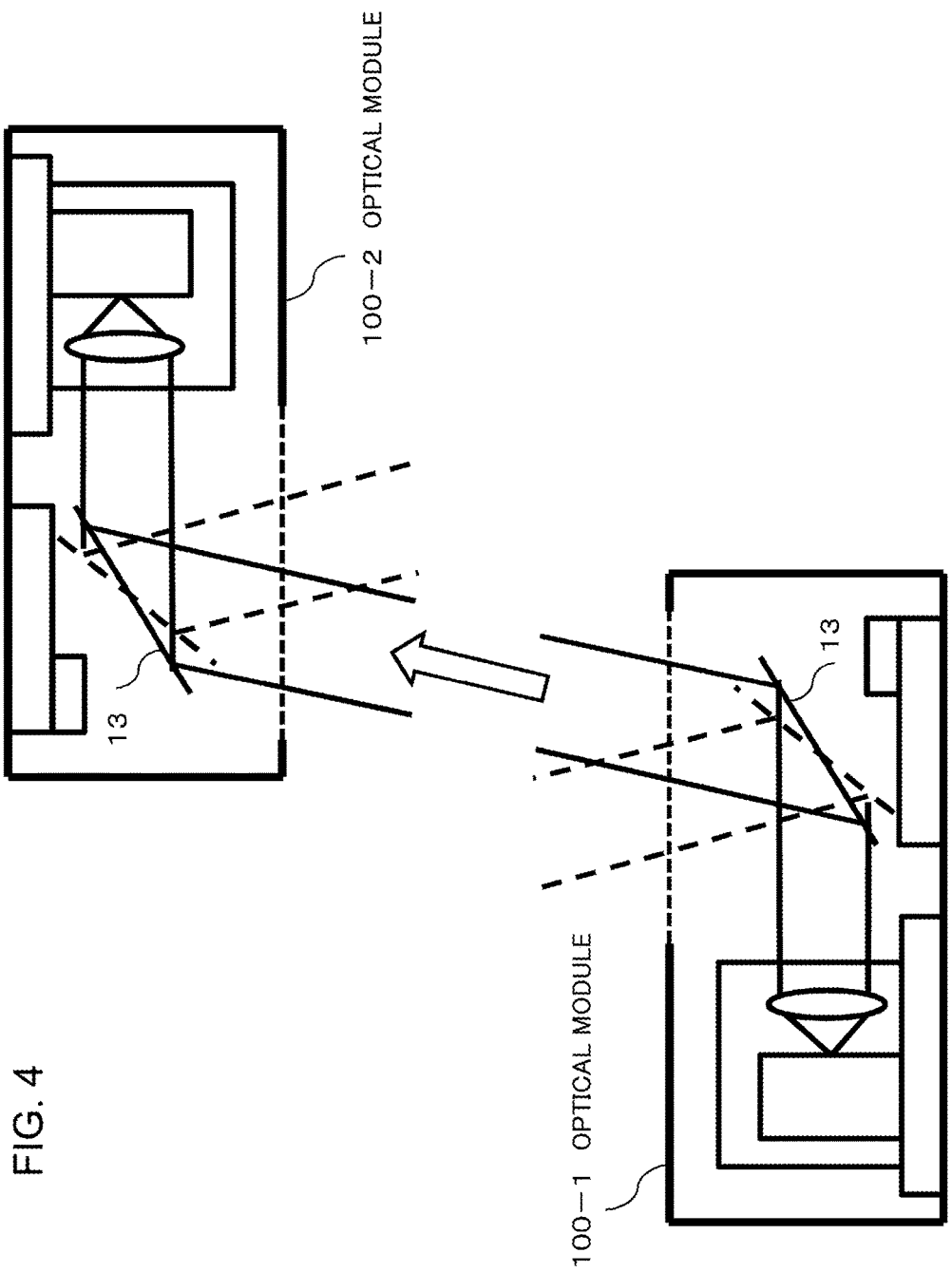
FIG. 4 is a diagram indicating an example of a structure in which pieces of optical module 100 are facing to each other.

FIG. 4 is a diagram which shows an example of a structure in which pieces of optical module 100 are opposite to each other. An optical module 100-1 is the optical module 100 shown in FIG. 3 having an optical transmission function. An optical module 100-2 is the optical module 100 shown in FIG. 3 having an optical reception function. In FIG. 4, the collimated light that the optical module 100-1 has sent is received in the optical module 100-2 by adjusting both mirrors of the optical modules 100-1 and 100-2 to have the tilt angle of the continuous line. For example, by performing intensity modulation of collimated light transmitted by the optical module 100-1 by information signals, and by receiving in the optical module 100-2 the collimated light for which the intensity modulation has been performed, the information signals can be transmitted by optical space transmission. Modulation systems except the intensity modulation (e.g., optical phase modulation and optical frequency modulation) may be used as a modulation system.

Figure 5:
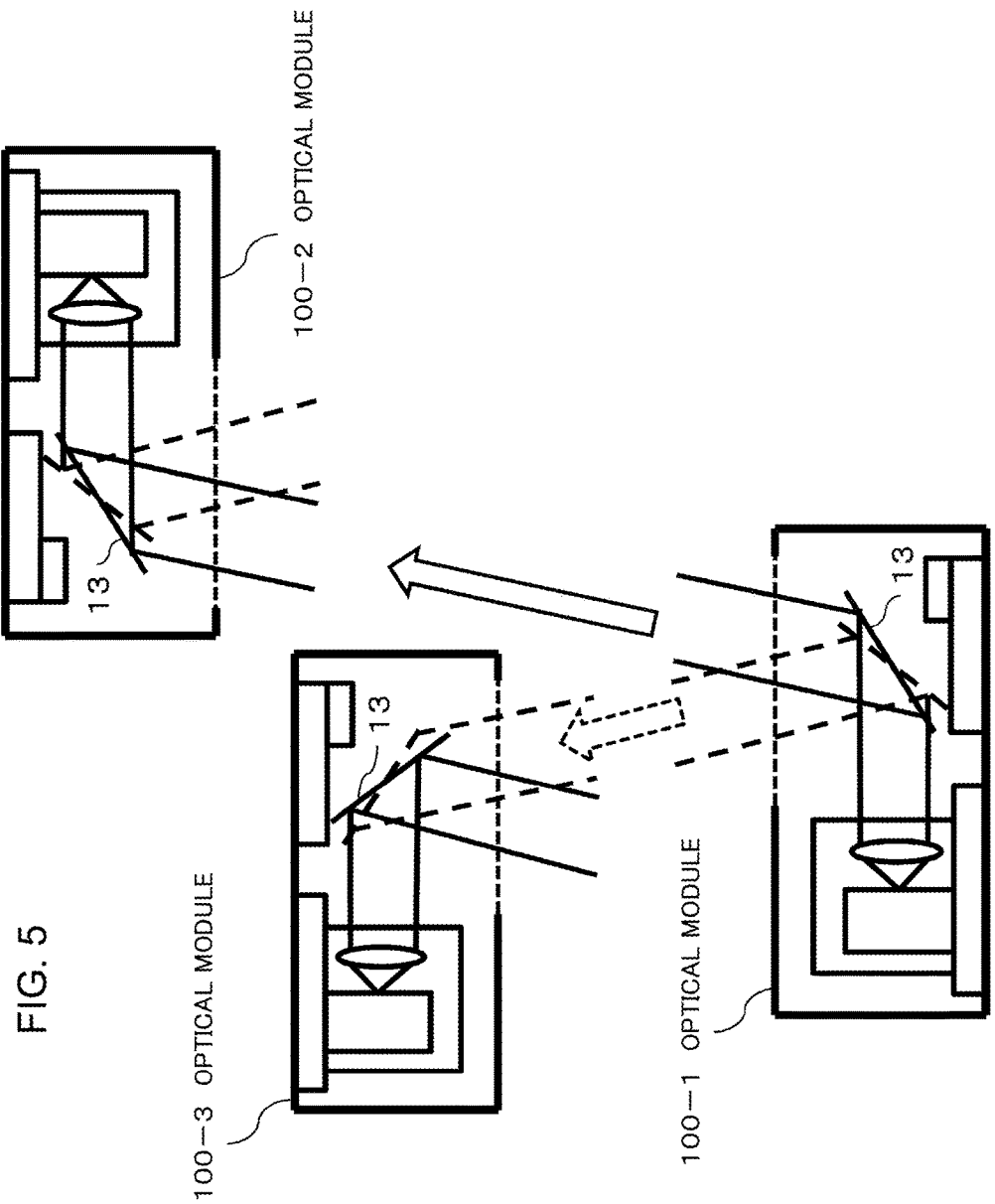
FIG. 5 is a diagram describing selection of an optical module to be a communication destination.

FIG. 5 is a diagram describing selection of an optical module to be a communication destination. The optical module 100-1 is the optical module 100 shown in FIG. 3 having an optical transmission function. The optical modules 100-2 and 100-3 are the optical module 100 shown in FIG. 3 having an optical reception function. In a similar fashion with FIG. 4, the collimated light that the optical module 100-1 has sent is received in the optical module 100-2 by adjusting the mirrors of both of the optical module 100-1 and 100-2 so that they may have the tilt angle shown in the continuous line. On the other hand, by adjusting the mirror 13 of both the optical modules 100-1 and 100-3 so that the mirrors may have the tilt angles shown in the dashed lines, the collimated light that the optical module 100-1 has sent is received in the optical module 100-3. Thus, by installing the optical module 100 so that it can perform transmission and reception with different optical modules for each tilt angle of the mirror, combination of communicable optical modules can be selected based on voltage applied to the electrode.

As above, an optical module of the first embodiment can change an opposite communication destination in a simple structure.

Second Embodiment

As the second embodiment of the present invention, an optical space transmission system using the optical module 100 will be described.

Figure 6:
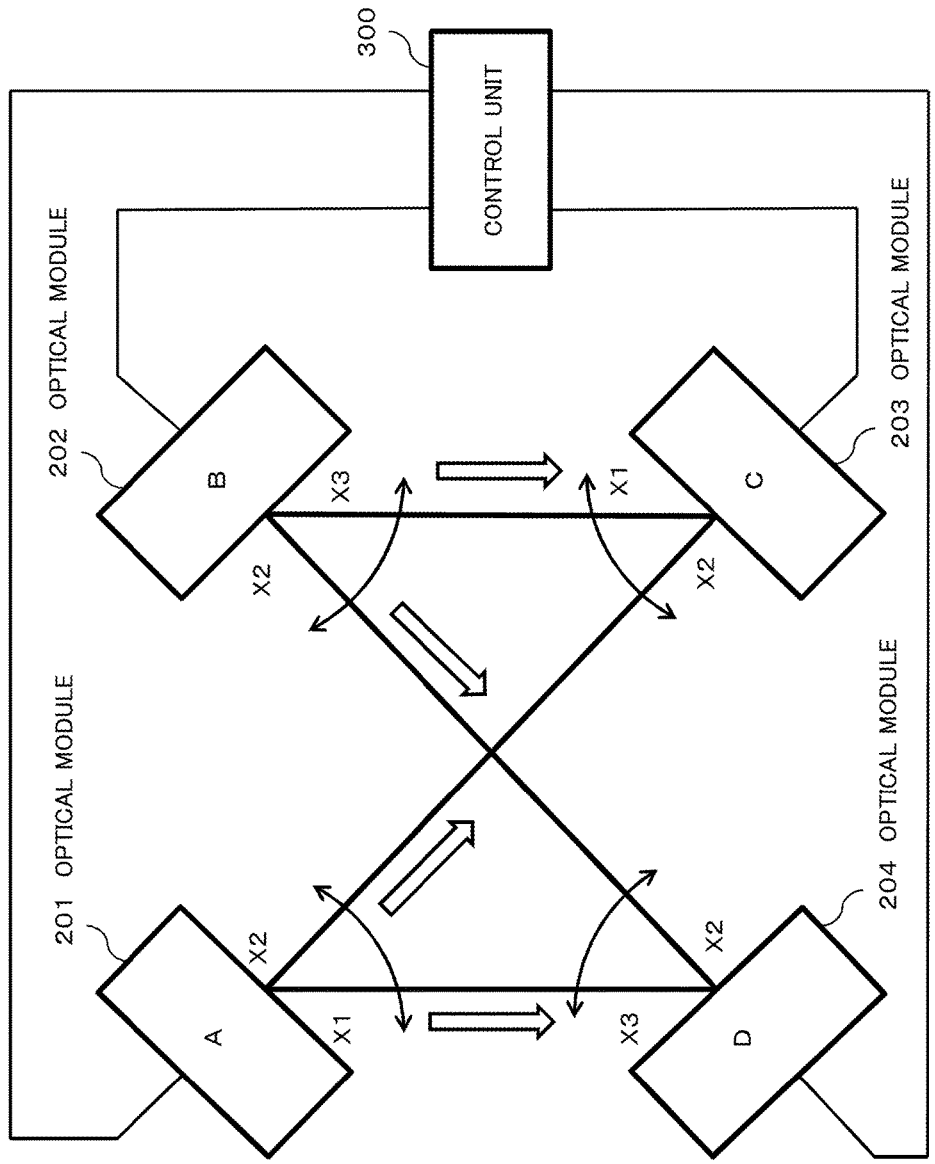
FIG. 6 is a block diagram indicating a structure example of an optical space transmission system 1 of a second embodiment.

FIG. 6 is a diagram indicating a structure example of the optical space transmission system 1 in which four pieces of optical module 100 are placed. The optical space transmission system 1 includes four optical modules 201-204 and a control unit 300. The optical modules 201 and 202 have a structure like the optical module 100-1 that has a transmitting function illustrated in FIGS. 4 and 5. The optical modules 201 and 202 are shown in FIG. 6 by identifiers A and B, respectively. The optical modules 203 and 204 include a structure like the optical module 100-2 having the reception function illustrated in FIGS. 4 and 5. The optical modules 203 and 204 are shown in FIG. 6 by identifiers C and D, respectively. That is, the optical modules 201 and 202 are transmitting ends, and the optical modules 203 and 204 are receiving ends. In the optical space transmission system 1, one of the optical modules 201 and 202 of the transmitting ends and one of the optical modules 203 and 204 of the receiving ends are placed in a manner being faceable by adjusting a tilt angle of the mirror 13 provided in each of them.

The control unit 300 controls, based on a connection request from one of the optical modules 201-204, voltage to be applied to the electrode 17 so as to change a tilt angle of the mirror 13 of an optical module to be made face. The optical modules 201-204 and the control unit 300 are connected by wired or wireless control lines for transmitting and receiving a control signal. The control lines may be of a relatively low speed because transmission of a control signal does not need a large capacity. For example, a wireless LAN network and a visible light communication network may be used as a control line.

The function and the operation procedure of the control unit 300 may be implemented by a central processing unit (CPU) included in the control unit 300 performing a program stored in a recording medium. The program is recorded in a non-transitory computer readable medium which is fixed. The non-transitory computer readable medium may be provided in the control unit 300. As the non-transitory computer readable medium, semiconductor memories or hard disc drives are used, but it is not limited to these.

In FIG. 6, an optical path of collimated light to propagate between the optical modules 201-204 is selected by setting of a tilt angle of the mirror 13. In the figure, all of X1, X2 and X3 show a tilt angle of the mirror 13. For example, when a tilt angle of the mirror 13 of the optical module 201 (A) is X1, and a tilt angle of the mirror 13 of the optical module 204 (D) is X3, the optical module 201 (A) and the optical module 204 (D) face each other to be communicable. That is, an optical signal that the optical module 201 (A) has transmitted is received in the optical module 204 (D). Relation between a tilt angle of the mirror 13 and an optical module that is faceable at that tilt angle can be measured or determined at the time of installing the optical modules based on a control range of a tilt angle or installation direction of the optical module. Relation between a setting value of the tilt angle and an optical module that is faceable on that occasion, which has been determined, is recorded in the control unit 300 as a table. The control unit 300 can know the tilt angle to be set to each of opposite optical modules by searching this table using a combination of two optical modules desired to make face as a key.

Meanwhile, the arrangement of four optical modules in FIG. 6 shows relation of a plurality of optical paths for explanation of the embodiment conceptually. The arrangement of the geometric shape of the optical modules 201-204 shown in FIG. 6 does not show that this is necessary. Also, the number of optical modules forming a system is not limited to four.

Figure 7:
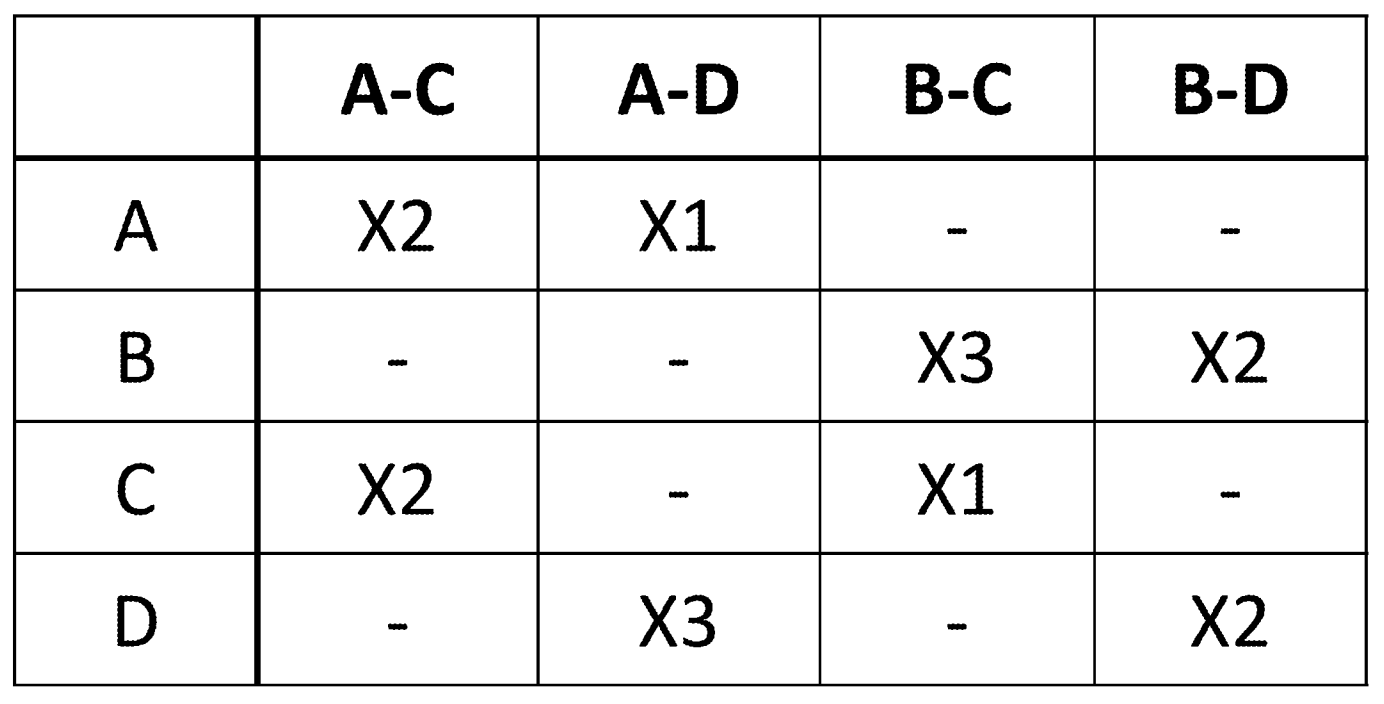

FIG. 7 shows a table indicating opposed combinations of the optical modules 201-204 and a setting example of a tilt angle of the mirror 13 on that occasion. For example, when the optical module 201 (A) and the optical module 204 (D) are connected, the control unit 300 refers to the line of A-D of the table of FIG. 7 to set a tilt angle of the mirror 13 of the optical module 201 (A) to X1 and a tilt angle of the optical module 204 (D) to X3. As a result, the light that the optical module 201 transmits is received in the optical module 204. In FIG. 7, a tilt angle of mirror 13 of an optical module which is shown by "-" is arbitrary. Therefore, for example, connection between the optical modules 201 (A) and 203 (C), and connection between the optical modules 201 (B) and 204 (D) can be set at the same time. Likewise, connection of the optical modules 201 (A) and 204 (D), and connection of the optical modules 202 (B) and 203 (C) can be also set at the same time.

In the present embodiment, it is arranged such that, about all pieces of mirror 13 of the optical modules 201-204, a tilt angle can be set to one of three of X1, X2, and X3. Magnitude of a tilt angle and the number of settable angles may be different for each of the optical modules 201-204 because a setting value of a tilt angle is decided by specifications of the mirror 13 of each optical module. Based on combination of tilt angles settable to each optical module, specifications of the mirror 13 and a position of an optical module at the time of installation are determined so that an optical path is formed between an opposed optical modules.

Figure 8:
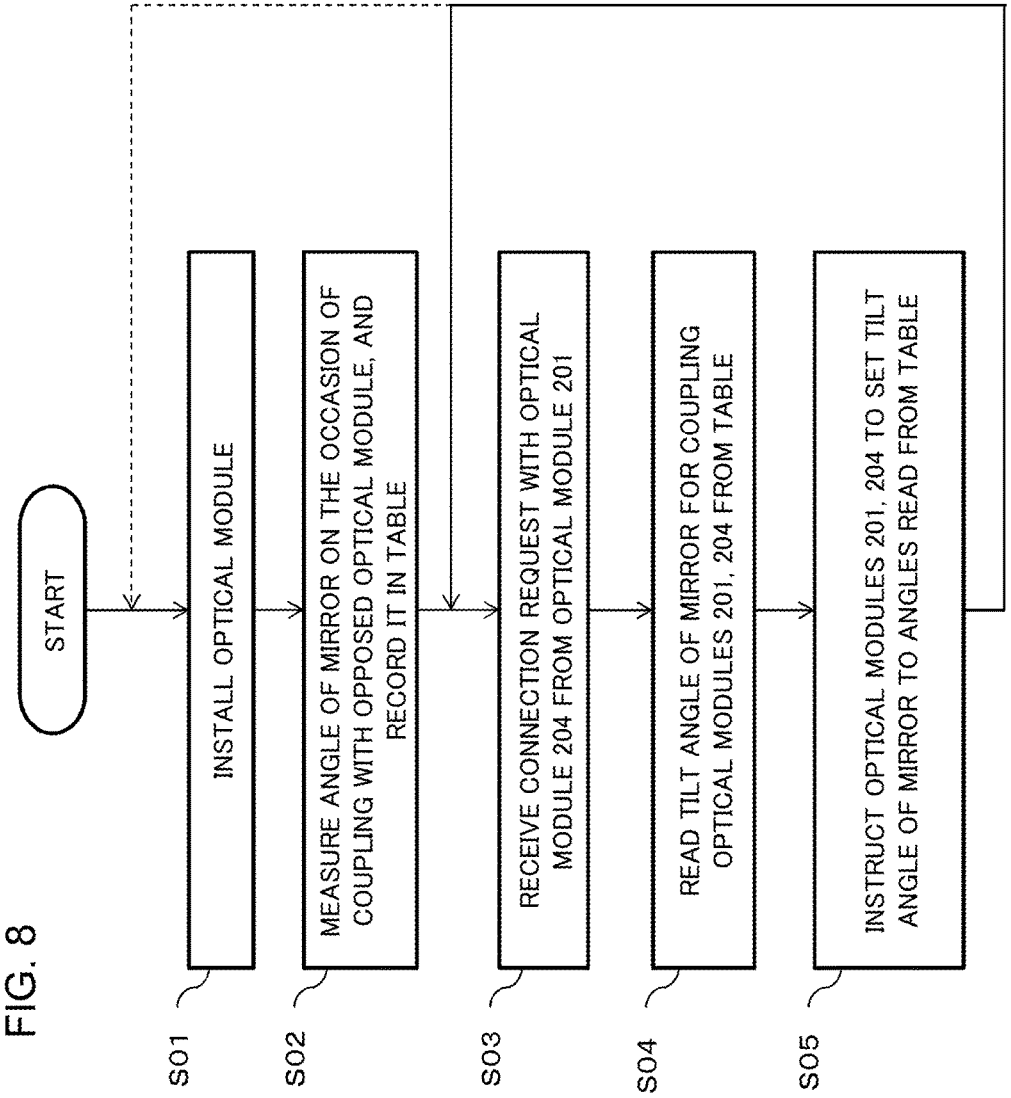
FIG. 8 is flow chart indicating an installation example of optical modules and a control procedure of the mirror 13.

FIG. 8 is a flow chart which shows an example of installation of an optical module and a control procedure of the mirror 13. First, optical modules to perform optical space transmission are installed in an opposed manner (step S01 of FIG. 8). When installing optical modules, it is set such that optical modules which are going to be made opposed to each other emit and receive light experimentally, for example, and the position of an optical module is adjusted so as to be able to communicate normally. A tilt angle of the mirror 13 is selected.

After having adjusted a position of an optical module, the position of the optical module may be fixed. Furthermore, it is desirable that the adjustment of the position of an optical module and selection of a tilt angle of the mirror 13 be performed in a manner that, when making an optical module face another optical module, the facing work can be performed only by adjusting the tilt angle.

The relation between the identifier (e.g., A-D of FIG. 6) of an opposed optical module and the tilt angle (e.g., X1-X3) of the mirror on that occasion obtained as a result of adjustment is recorded to the control unit 300 as a table as shown in FIG. 7 (step S02).

After the installation of the optical modules, operation of the optical space transmission system is actually started. Below, description will be made about a case when the optical module 201 (A) requires communication with the optical module 204 (D) in the optical space transmission system 1 of FIG. 6.

The optical module 201 sends to the control unit 300 a connection request to the optical module 204 (D) through the control line. Upon receiving the connection request from the optical module 201 (A) (step S03), the control unit 300 reads the angles of the mirror 13 for connecting the optical modules 201 and 204 from the table of FIG. 7 (step S04). Here, tilt angle X1 corresponding to identifier A of the optical module 201 and tilt angle X3 corresponding to identifier D of the optical module 204 are read using identifiers A and D of the optical modules 201 and 204 as a key.

The control unit 300 instructs the optical modules 201 and 204 through the control line to set a tilt angle of each mirror 13 to the angles read from the table (step S05). That is, the control unit 300 sends indication to make a tilt angle be X1 to the optical module 201 and sends indication to make a tilt angle be X3 to the optical module 204. In this way, the optical module 204 is coupled with the optical module 201 optically, and optical space transmission is becomes possible between the both. The control unit 300 carries out the procedures of step S03-S05.

When a further optical module is installed, the flow of FIG. 8 returns to step S01 via the dashed line, and information of the tilt angles of the mirrors of the further installed optical module and an optical module opposed to it may be added to the table of FIG. 7.

Note that, the connection request of the optical module does not have to be performed from the optical module of the emission side (transmitting end). The optical module 203 or 204 of the receiving end may designate the optical module 201 or 202 of the transmitting ends to send a connection request to the control unit 300.

As discussed above, the optical space transmission system 1 of the second embodiment changes optical paths using mirrors that are built in optical modules. That is, the optical space transmission system 1 of the second embodiment can change an opposed communication destination by a simple structure.

Third Embodiment

In the first and second embodiments, description has been made about the case where opposed optical modules perform single way transmission. In the third to fifth, structures capable of bidirectional transmission will be described.

Figure 9:
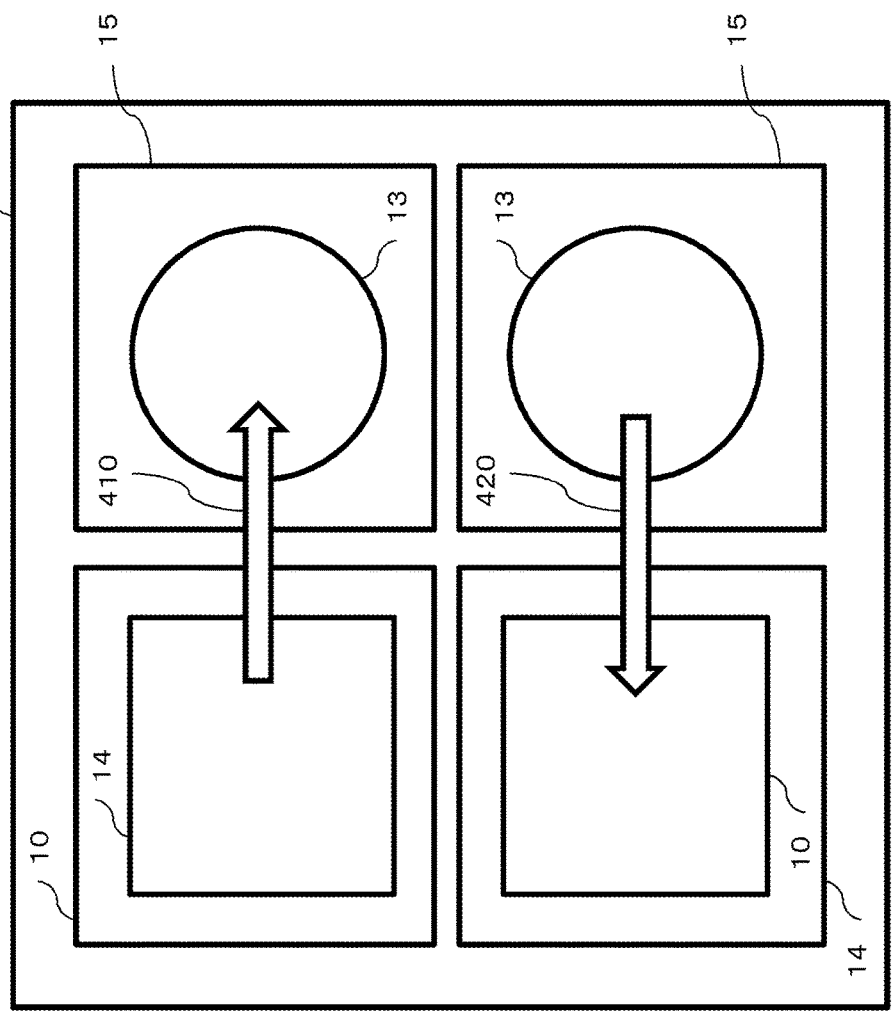
FIG. 9 is an example of a top view of an optical module 400 of a third embodiment.

FIG. 9 is an example of a top view of the optical module 400 of the third embodiment. The optical module 400 includes two sets of constituent elements of the optical module 100 of the first embodiment in parallel, and performs reception in one and transmission in the other. FIG. 9 shows that the optical module 400 includes the optical collimator 10, the mirror 13, and the substrates 14 and 15 by two sets, respectively. The optical module 400 communicates with an opposed optical module by two beams of collimated light of a transmitted optical signal (arrow 410 and received collimated light (arrow 420). An operation to change an opposed optical module by control of the direction of collimated light by the mirror 13 is similar to that of the optical module 100 of the first embodiment.

Also by the optical module 400 of such structure, an optical module which can change an opposed communication destination by a simple structure is provided like the optical module 100 of the first embodiment.

Fourth Embodiment

Figure 10:
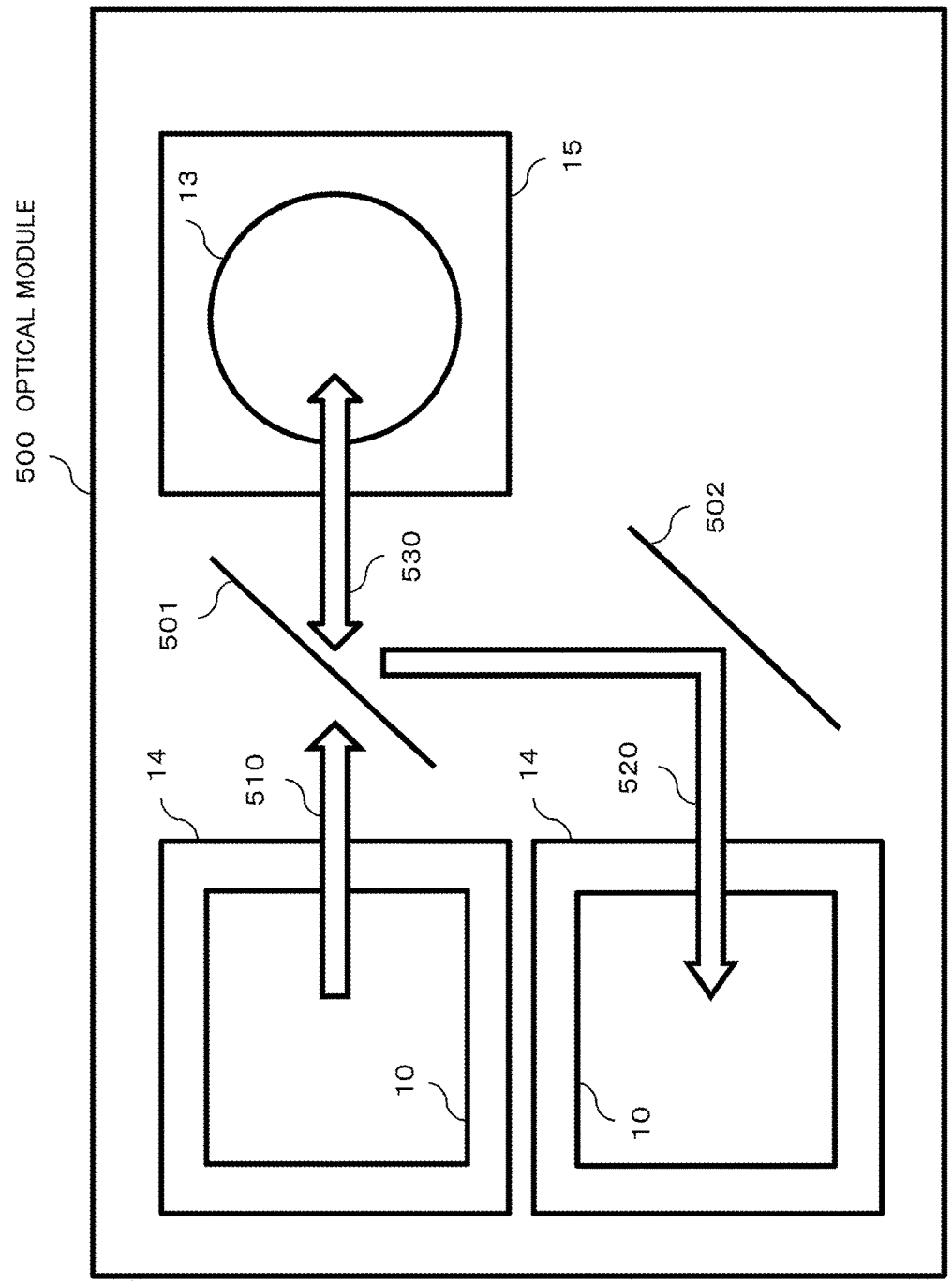
FIG. 10 is an example of a top view of an optical module 500 of a fourth embodiment.

In the fourth embodiment, an optical module capable of bidirectional transmission only using one mirror will be described. FIG. 10 is an example of a top view of the optical module 500 of the fourth embodiment. In comparison with the optical module 400 shown in FIG. 9, the optical module 500 includes the mirror 13 only one piece, and includes an optical coupler 501 and a reflecting mirror 502. In FIG. 10, the collimated light (arrow 510) transmitted from the optical collimator 10 of the transmitting end penetrates the optical coupler 501, and then is output toward front face of the paper in a manner intersecting with the paper face by the mirror 13 (arrow 530). On the other hand, collimated light to be received in the optical module 500 goes to the mirror 13 in a manner intersecting with the paper face, and then it is reflected by the optical coupler 501 and the reflecting mirror 502 and is received by the optical collimator 10 of the receiving end (arrow 530, arrow 520). By such structure, transmission collimated light and reception collimated light (arrows 510 and 520) can be made to propagate in the same optical path.

The optical module 500 of the fourth embodiment can change a communication destination to be opposed in a simple structure like the optical module 400 of the third embodiment. Furthermore, in the optical module 500, the number of mirrors having a movable part is reduced, and optical space transmission is possible in one optical path. Therefore, in comparison with the optical module 400 of the third embodiment, the optical module 500 plays an effect that reliability of an optical module is improved and, in addition, position adjustment of an optical module at the time of installation is easy.

As the optical coupler 501, a half mirror which has transmissivity and reflectance of approximately 50% can be used. In this case, the emission wavelength of an optical emitting component used for the transmission and the wavelength of collimated light received from an opposed optical module may be the same or may be different.

Also, as the optical coupler 501, an optical filter can be used. For example, as the optical coupler 501, a wavelength range of transmitted light (arrow 510) penetrates the optical filter, and a wavelength range of received light (arrow 520) is reflected by the optical filter. In this case, it is necessary that the wavelength of light to be transmitted and the wavelength of light received from an opposed optical module are different from each other. However, since transmit signals and received signals are separated by an optical filter, decline of the transmission performance due to the cross talk caused by these signals is inhibited. For example, the optical coupler 501 may be made by a glasswork onto which a dielectric multilayer film is deposited or an optical waveguide with a branching function of light or a separation function of wavelengths.

Description of the electrode (the electrode 17 of the optical module 100) driving the mirror 13 is omitted in each of the diagrams of the optical module 400 of FIG. 9 and the optical module 500 of FIG. 10. However, like an optical module of the first embodiment, a tilt angle of the mirror 13 is controlled by voltage applied to the electrode.

Fifth Embodiment

Figure 11:
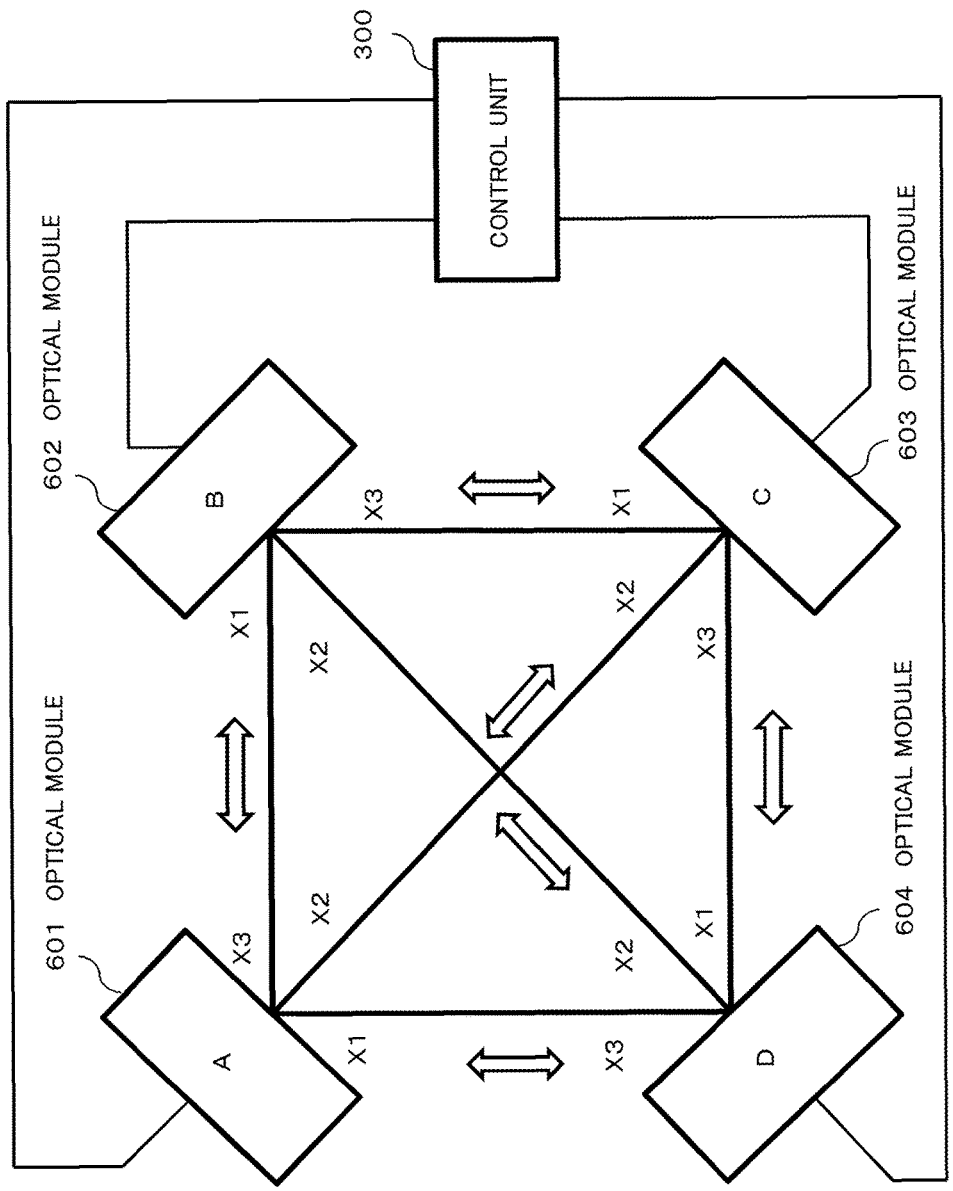
FIG. 11 is block diagram indicating a structure example of an optical space transmission system 2 of a fifth embodiment.

An optical space transmission system using an optical module capable of bidirectional transmission will be described. FIG. 11 is a block diagram which shows a structure example of the optical space transmission system 2 of the fifth embodiment of the present invention. A basic structure and the function of the optical space transmission system 2 are similar to those of an optical space transmission system 1 of the second embodiment except that bidirectional transmission is possible using optical modules having been installed. Therefore, in below, difference with the second embodiment is described mainly, and repeated explanation is omitted.

The optical space transmission system 2 includes four optical modules 601-604 and the control unit 300. The optical modules 601-604 have a structure like the optical module 500 having transmission and reception functions illustrated in FIG. 10, and they are shown in FIG. 11 by identifiers A, B, C, and D, respectively. Since the optical modules 601-604 can carry out bidirectional transmission, optical paths are also configurable between the optical modules 601 (A) and 602 (B), and between the optical modules 603 (C) and 604 (D). In the fifth embodiment, each of the optical modules 601-604 is all opposed with other optical modules using all of tilt angles X1-X3.

The control unit 300 controls voltage to apply to an electrode so as to change a tilt angle of the mirror 13 of optical modules to be opposed based on a connection request from one of the optical modules 601-604. Note that, like the second embodiment, the magnitude of a tilt angle of the mirror 13 and the number of configurable angles may be different for each of the optical modules 601-604. Also, the number of optical modules forming a system is not also limited to four.

FIG. 12 is an example of a table showing combinations of the optical modules 601-604 being opposed and setting examples of a tilt angle of the mirror 13 on that occasion. For example, when the optical module 601 (A) and the optical module 602 (B) are connected, the control unit 300 sets a tilt angle of the mirror 13 of the optical module 601 (A) to X3 and a tilt angle of that of the optical module 602 (B) to X1 with reference to the line of A-B of the table of FIG. 12. As a result, two-way communication is enabled between the optical module 601 and the optical module 602. Note that, explanation of the procedure of setting of a tilt angle by the control unit 300 will be omitted in the present embodiment because it is similar to that of FIG. 8 of the second embodiment basically.

In FIG. 11, a tilt angle of mirror 13 of optical module which is shown by "-" is arbitrary. Therefore, connection between the optical modules 601 (A) and 602 (B) and connection between the optical modules 603 (C) and 604 (D) can be set at the same time. Likewise, connection between the optical modules 601 (A) and 604 (D) and connection between the optical modules 602 (B) and 603 (C) are also settable at the same time.

Meanwhile, the embodiments of the present invention can be also described like the following supplementary notes, but not limited to these.

(Supplementary Note 1)

An optical module comprising: an optical collimator to take in and output collimated light; and a mirror capable of taking a tilt angle to make the collimated light and the optical collimator be coupled.

(Supplementary Note 2)

The optical module according to supplementary note 1, wherein the optical collimator comprises an optical emitting component, and the optical emitting component outputs the collimated light modulated by an applied electrical signal.

(Supplementary Note 3)

The optical module according to supplementary note 1, wherein the optical collimator comprises an optical receiving component, and the optical receiving component outputs photo electric current corresponding to intensity of the collimated light having been received.

(Supplementary Note 4)

An optical module, comprising an optical module according to supplementary note 2 and an optical module according to supplementary note 3, the optical modules being constructed integrally.

(Supplementary Note 5)

The optical module according to supplementary note 1, wherein the optical collimator comprises:

a transmitting collimator to output light output by an optical emitting component as collimated light; and a receiving collimator to output photo electric current corresponding to intensity of collimated light being received by an optical receiving component, and further comprises, between the optical collimator and the mirror, a coupling element to couple an optical path of collimated light sent from the transmitting collimator and an optical path of collimated light received by the receiving collimator.

(Supplementary Note 6)

The optical module according to supplementary note 5, wherein the coupling element comprises one of an optical directional coupler and a half mirror, and the optical emitting component and the optical receiving component respectively transmits and receives light of a same wavelength range.

(Supplementary Note 7)

The optical module according to supplementary note 5, wherein the coupling element comprises one of an optical multiplexer/demultiplexer, a directional coupler and a half mirror, and the optical emitting component and the optical receiving component respectively transmits and receives light of different wavelength ranges.

(Supplementary Note 8)

The optical module according to any one of supplementary notes 1-7, wherein the mirror is formed by a micro electro mechanical system technology.

(Supplementary Note 9)

An optical transmission system comprising at least two optical modules according to any one of supplementary notes 1-8 placed in an opposed manner so as to be able to communicate with each other.

(Supplementary Note 10)

The optical transmission system according to supplementary note 9, further comprising a controller including a table recording a tilt angle to be set to the mirror of each of the optical modules, wherein the controller notifies, upon receiving from one of the optical modules a connection request with another of the optical modules, the one optical module and the other optical module of an instruction to control so as to make the tilt angle of the mirror of each of the one optical module and the other optical module be an angle recorded on the table.

(Supplementary Note 11)

A control method of an optical module including an optical collimator to take in and output collimated light and a mirror, the method comprising setting a tilt angle of the mirror so as to make the collimated light and the optical collimator be coupled.

(Supplementary Note 12)

A control method of an optical transmission system, the method comprising: receiving from a first optical module a request for connection with a second optical module; reading a tilt angle of a mirror of the first optical module and a tilt angle of a mirror of the second optical module for connecting the first optical module and the second optical module; and instructing the first optical module and the second optical module to perform setting of the respective tilt angles read from the table.

(Supplementary Note 13)

A control program of an optical transmission system to make a computer provided in the optical transmission system perform the steps of:

receiving from a first optical module a request for connection with a second optical module;

reading a tilt angle of a mirror of the first optical module and a tilt angle of a mirror of the second optical module for connecting the first optical module and the second optical module; and instructing the first optical module and the second optical module to perform setting of the respective tilt angles read from the table.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Also, the structures described in each embodiment are not necessarily exclusive to each other. The operation and working-effect of the present invention may be realized by a structure in which all or a part of the above-mentioned embodiments are put together.

What is claimed is:

1. An optical transmission system comprising optical modules and a controller, wherein each of the optical modules comprise an optical collimator to take in and output collimated light, and a mirror capable of taking a tilt angle to make the collimated light and the optical collimator be coupled, wherein the controller includes a table recording a tilt angle to be set to the mirror of each of the optical modules, and wherein at least two of the optical modules are placed in an opposed manner so as to be able to communicate with each other, and the controller is configured to notify, upon receiving from one of the optical modules a connection request with another of the optical modules, the one optical module and the other optical module of an instruction to control to make the tilt angle of the mirror of each of the one optical module and the other optical module be an angle recorded on the table.

2. The optical transmission system according to claim 1, wherein the optical collimator comprises an optical emitting component, and the optical emitting component outputs the collimated light modulated by an applied electrical signal.

3. The optical transmission system according to claim 1, wherein the optical collimator comprises an optical receiving component, and the optical receiving component outputs photo electric current corresponding to intensity of the collimated light having been received.

4. The optical transmission system according to claim 1, wherein the optical collimator comprises: a transmitting collimator to output light output by an optical emitting component as collimated light; and a receiving collimator to output photo electric current corresponding to intensity of collimated light being received by an optical receiving component, and further comprises, between the optical collimator and the mirror, a coupling element to couple an optical path of collimated light sent from the transmitting collimator and an optical path of collimated light received by the receiving collimator.

5. The optical transmission system according to claim 4, wherein the coupling element comprises one of an optical directional coupler and a half mirror, and the optical emitting component and the optical receiving component respectively transmits and receives light of a same wavelength range.

6. The optical transmission system according to claim 4, wherein the coupling element comprises one of an optical multiplexer/demultiplexer, a directional coupler and a half mirror, and the optical emitting component and the optical receiving component respectively transmits and receives light of different wavelength ranges.

7. The optical transmission system according to claim 1, wherein the mirror is formed by a micro electro mechanical system technology.

8. The optical transmission system according to claim 2, wherein the mirror is formed by a micro electro mechanical system technology.

9. The optical transmission system according to claim 3, wherein the mirror is formed by a micro electro mechanical system technology.

10. The optical transmission system according to claim 4, wherein the mirror is formed by a micro electro mechanical system technology.

11. The optical transmission system according to claim 5, wherein the mirror is formed by a micro electro mechanical system technology.

12. The optical transmission system according to claim 6, wherein the mirror is formed by a micro electro mechanical system technology.

13. A control method of an optical transmission system comprising a first optical module and a second optical module each comprising an optical collimator to take in and output collimated light and a mirror, the method comprising: receiving from a first optical module a request for connection with a second optical module; reading a tilt angle of a mirror of the first optical module and a tilt angle of a mirror of the second optical module for connecting the first optical module and the second optical module; and instructing the first optical module and the second optical module to perform setting of the respective tilt angles read from the table.

* * * * *